No. 718,988. PATENTED JAN. 27, 1903.
W. F. DIAL, G. M. EAMES & G. H. DIMOND.
SEWING MACHINE FEED ACTUATING MECHANISM.
APPLICATION FILED MAY 8, 1901.
NO MODEL.
5 SHEETS—SHEET 1.

WITNESSES:

INVENTORS.

No. 718,988. PATENTED JAN. 27, 1903.
W. F. DIAL, G. M. EAMES & G. H. DIMOND.
SEWING MACHINE FEED ACTUATING MECHANISM.
APPLICATION FILED MAY 8, 1901.
NO MODEL. 5 SHEETS—SHEET 2.
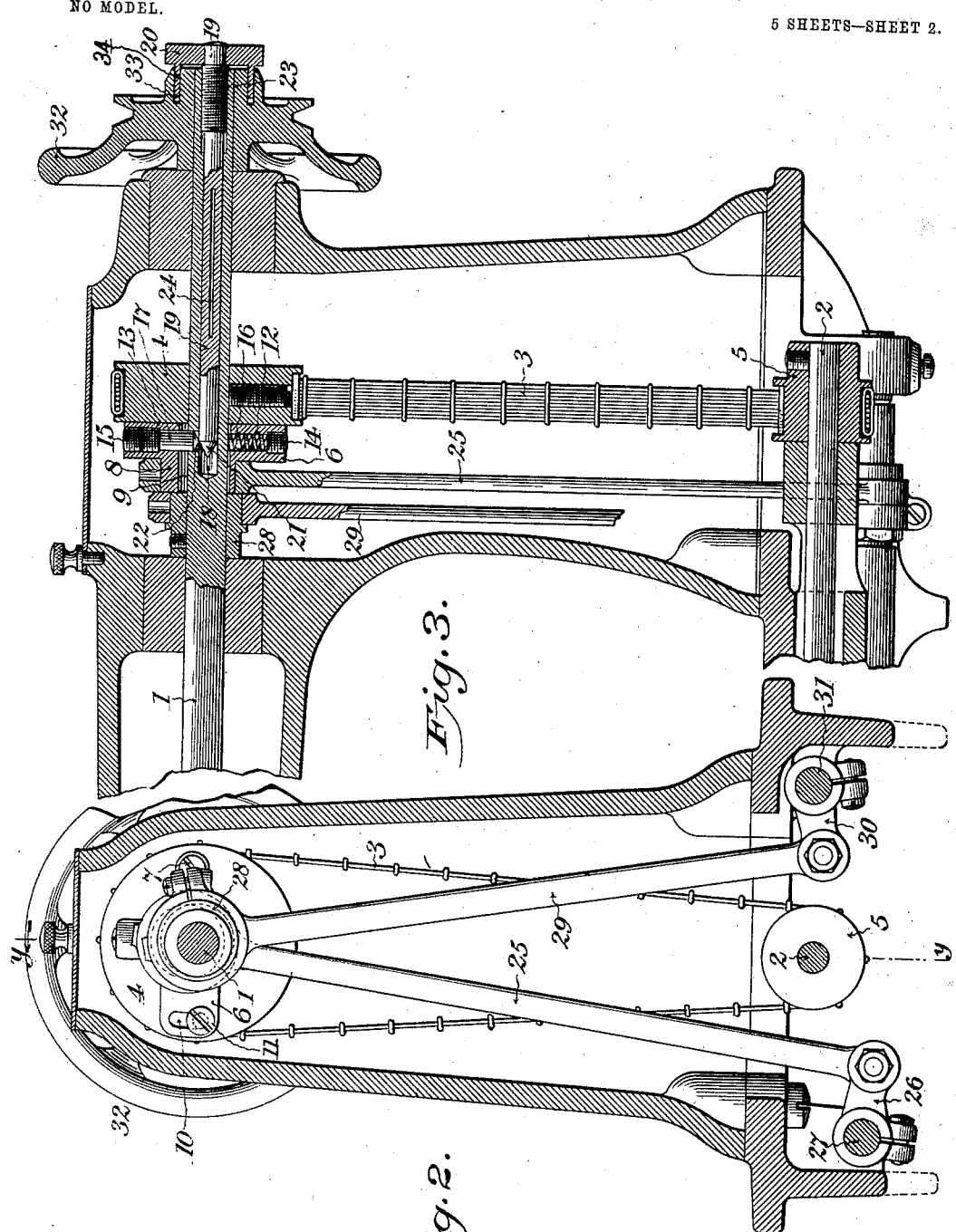
WITNESSES:
INVENTORS.
ATTORNEY

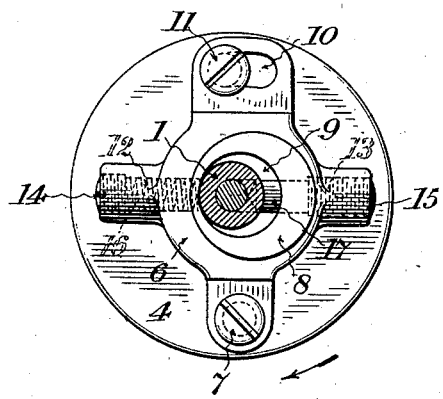
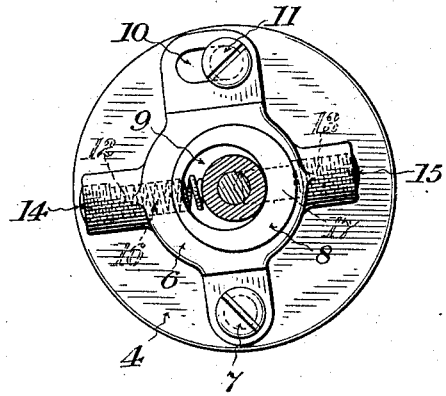
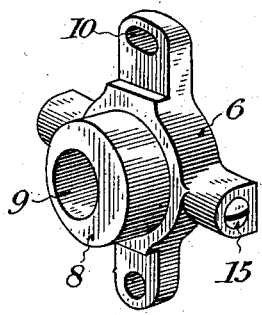
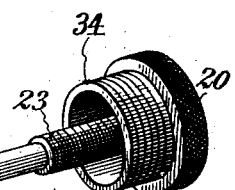

No. 718,988. PATENTED JAN. 27, 1903.
W. F. DIAL, G. M. EAMES & G. H. DIMOND.
SEWING MACHINE FEED ACTUATING MECHANISM.
APPLICATION FILED MAY 8, 1901.
NO MODEL. 5 SHEETS—SHEET 4.
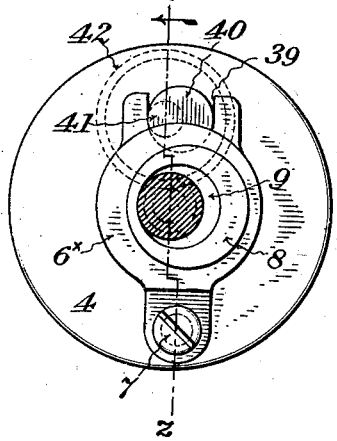
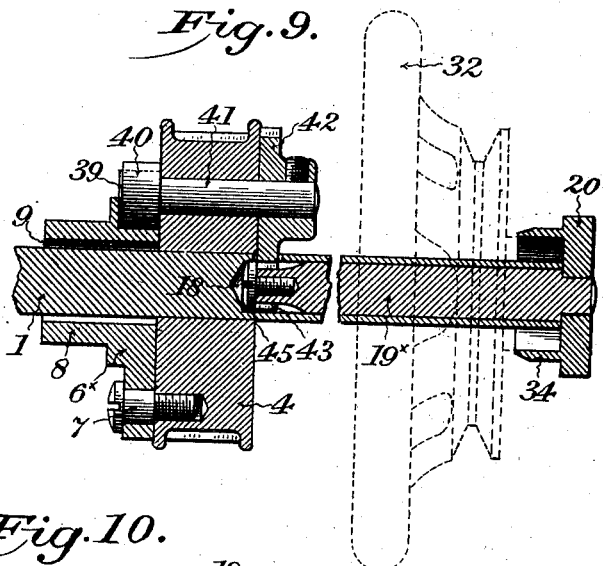
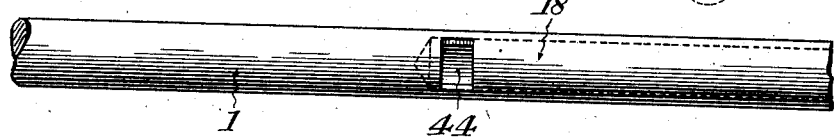
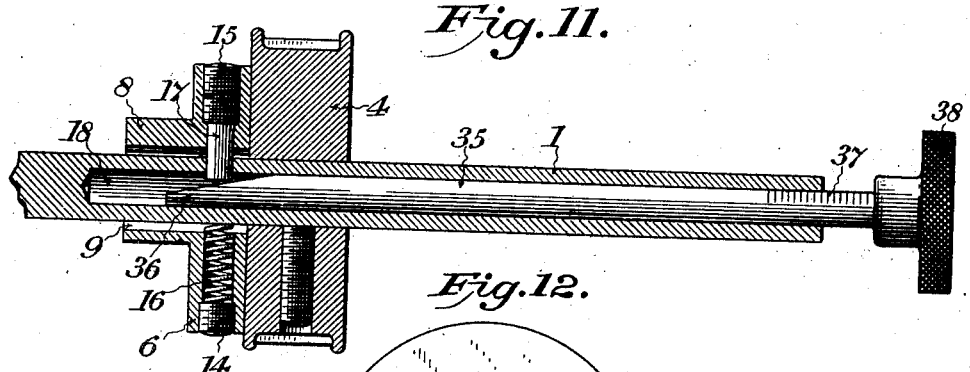
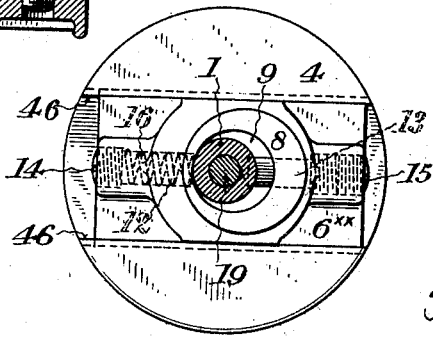
WITNESSES:
INVENTORS.
William F. Dial
George M. Eames
George H. Dimond
by Wm. H. Kimmel
ATTORNEY No. 718,988. PATENTED JAN. 27, 1903.
W. F. DIAL, G. M. EAMES & G. H. DIMOND.
SEWING MACHINE FEED ACTUATING MECHANISM.
APPLICATION FILED MAY 8, 1901.
NO MODEL. 5 SHEETS—SHEET 5.

WITNESSES:
INVENTORS.
Wilbur F. Dial
George M. Eames
George H. Dimond
by ATTORNEY

UNITED STATES PATENT OFFICE.

WILBUR F. DIAL, GEORGE M. EAMES, AND GEORGE H. DIMOND, OF BRIDGEPORT, CONNECTICUT, ASSIGNORS TO WHEELER & WILSON MANUFACTURING COMPANY, OF BRIDGEPORT, CONNECTICUT, A CORPORATION OF CONNECTICUT.

SEWING-MACHINE FEED-ACTUATING MECHANISM.

SPECIFICATION forming part of Letters Patent No. 718,988, dated January 27, 1903.

Application filed May 8, 1901. Serial No. 59,270. (No model.)

*To all whom it may concern:*

Be it known that we, WILBUR F. DIAL, GEORGE M. EAMES, and GEORGE H. DIMOND, citizens of the United States, residing at Bridgeport, in the county of Fairfield and State of Connecticut, have invented a certain new and useful Improvement in Sewing-Machine Feed-Actuating Mechanisms, of which the following is a full, clear, and exact description.

This invention relates to a feed-adjusting mechanism for sewing-machines.

The object of the invention is to provide a mechanism of simple and efficient construction, convenient of manipulation, and which will enhance the symmetrical appearance of the machine by displacing the usual feed-adjusting levers or thumb-nuts attached to the base of the overhanging arm or projecting up through the bed of the machine.

To illustrate the construction and application of our invention, we have herein shown it combined with that form of well-known feed-actuating mechanism wherein an eccentric mounted upon a disk carried by the shaft which is employed to give motion to the feed-actuating mechanism acts upon a strap which through suitable connections moves the feed-actuating mechanism.

The invention consists of an adjusting-rod applied to the feed-actuating shaft and an eccentric on said shaft to change the eccentricity of said eccentric relatively to the shaft, and thereby to vary the throw of the feed, all as we will proceed now more particularly to set forth and claim.

Figure 1:
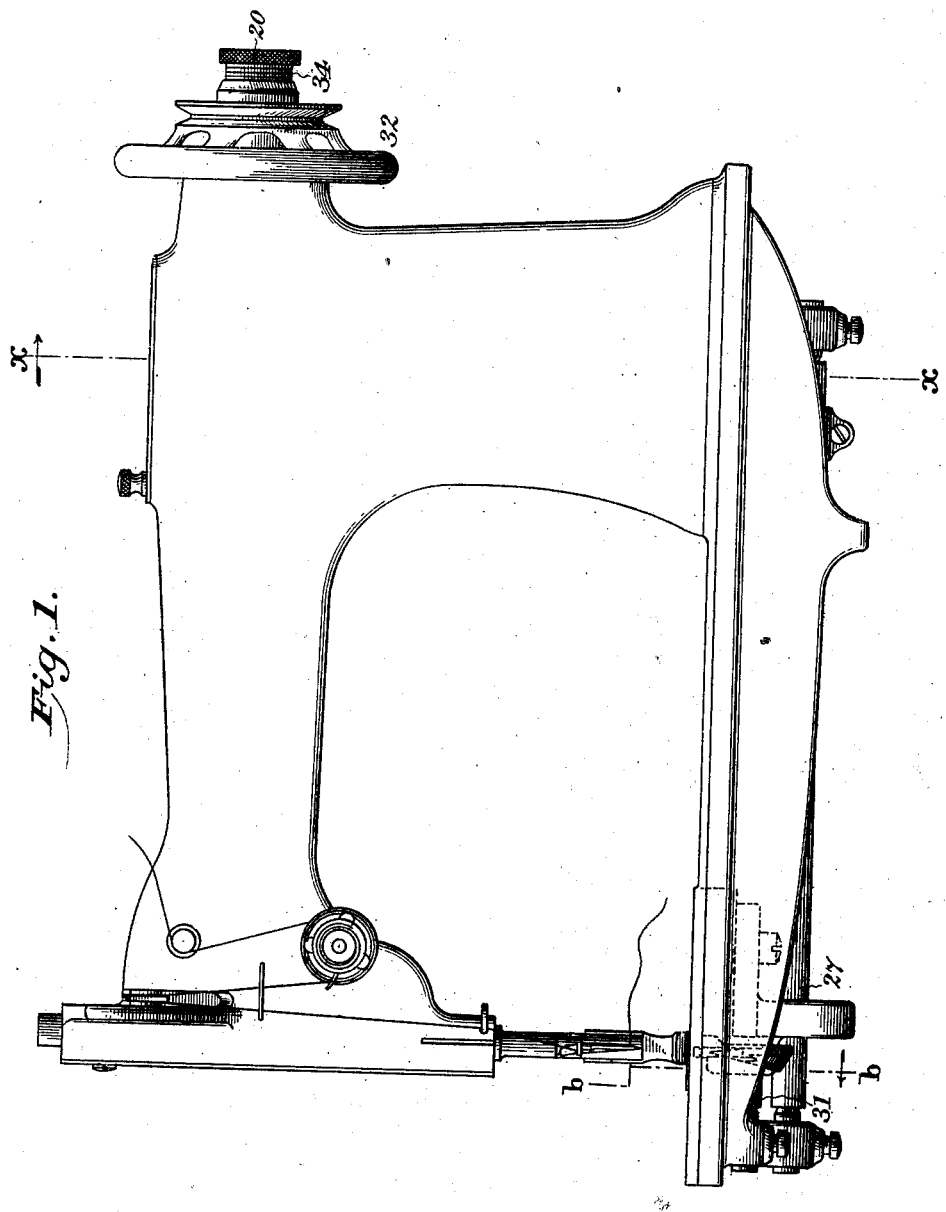
Figure 13:
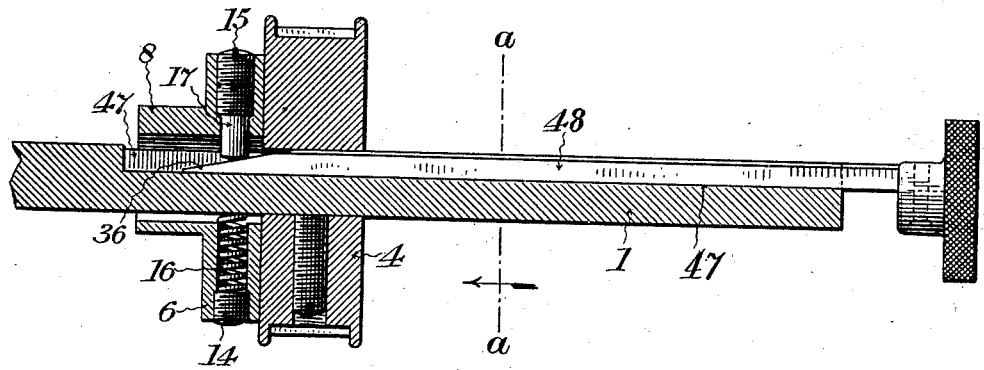
Figure 14:
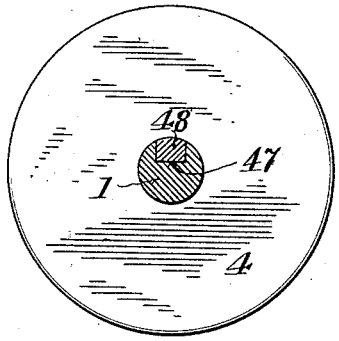
Figure 15:
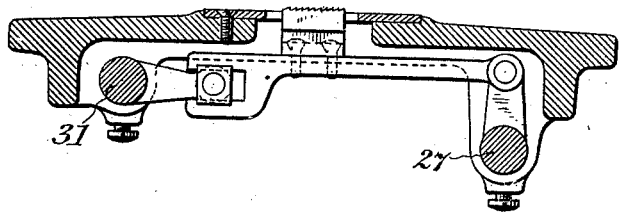

In the accompanying drawings, illustrating our invention, in the several figures of which like parts are similarly designated, Figure 1 is a front elevation of a sewing-machine equipped with our improved feed-adjusting mechanism, showing the external appearance of the latter. Fig. 2 is a cross-section taken in the plane of line $x$ $x$ of Fig. 1 looking in the direction indicated by the arrow; and Fig. 3 is a vertical longitudinal section taken in the plane of line $y$ $y$ of Fig. 2 and looking in the direction indicated by the arrow thereon, both Figs. 2 and 3 being on a somewhat larger scale than Fig. 1. Fig. 4 is a detail elevation of the adjustable eccentric, the latter being shown at its greatest degree of eccentricity. Fig. 5 is a detail elevation showing the eccentric adjusted to a position concentric with the driving-shaft. Fig. 6 is a perspective view of the adjustable eccentric detached. Fig. 7 is a perspective of the adjusting-rod detached. Fig. 8 is a view similar to Fig. 4, but illustrating a modified form of construction wherein the feed-actuating eccentric is shifted to or from the center of the driving-shaft by positive means. Fig. 9 is a section taken in the plane of line $z$ $z$ of Fig. 8, the usual band-wheel being shown in dotted lines; and Fig. 10 is a detail elevation of the shaft employed in this modified construction. Fig. 11 is a sectional elevation taken in a plane similar to that of Fig. 3, but illustrating a modified form of adjusting-rod. Fig. 12 is a modified form of construction wherein the parts are the same as illustrated in Figs. 3 and 4, with the exception that the eccentric frame is made to slide within suitable ways instead of being pivoted. Fig. 13 is a view similar to Fig. 11, but illustrating another modified form of adjusting-rod. Fig. 14 is a section in the plane of line $a$ $a$ of Fig. 13. Fig. 15 is a section taken in the plane of line $b$ $b$ of Fig. 1, showing parts of the feed mechanism and omitting the shafts.

In the drawings only so much of the sewing-machine is shown in detail as is deemed necessary for a proper understanding of our invention. In the particular type of sewing-machine illustrated the upper or needle-actuating shaft 1 is journaled within the usual arm in any suitable manner and is connected with the lower or hook-driving shaft 2 by an endless belt 3, adapted to engage pulleys 4 5, fast on said respective shafts; but we wish to be understood as not limiting our invention in this particular, since any approved means for connecting the upper or needle-actuating shaft with the lower or hook-actuating shaft will answer the purposes of our invention equally well. The upper pulley 4 in the present instance (in so far as the operation of the feed mechanism is concerned) serves as a convenient disk upon which is pivotally attached the adjustable feed eccentric-frame 6 by a pivot-screw 7. 8 is an eccentric formed integral with said frame and provided with an opening 9, through which said upper shaft 1 passes, the size of said opening with respect to the diameter of said shaft being such as to readily permit said eccentric-frame to swing on the pivot 7 for the purpose of adjusting said eccentric for the required length of throw, as will be readily understood by reference to Figs. 4 and 5.

10 is a short arcuate slot formed in the eccentric-frame 6 opposite the pivot-screw 7 and concentric therewith, and 11 is a headed screw fitted within said slot and tapped within the pulley or disk 4, by means of which an additional steadiness is obviously afforded said eccentric-frame. 12 and 13 are pockets formed in said eccentric-frame substantially diametrically opposite each other and approximately at right angles to a line intersecting the pivot-screw 7 and screw 11, the outer ends of said pockets being closed by the respective screws 14 and 15, tapped therein. Within the pocket 12 is housed a coil-spring 16, one end of which bears against the shaft 1, while the other end abuts against the screw 14, which closes the end of said pocket. Within the pocket 15 is a beveled-end screw-pin 17, whose threaded head takes within the internally-threaded outer end of said pocket and is backed up after the manner of a jam-nut by the screw 15.

Referring to Fig. 3, 18 is a longitudinal recess in the rear end of the shaft 1, within which is operatively mounted an adjusting-rod 19, whose free end projects beyond the end of said shaft and is equipped with a knurled thumb-piece 20. The forward end of the adjusting-rod 19 is made with a beveled portion 21, adapted to engage the beveled-end pin 17, carried by the eccentric-frame 6, a hole 22 being made in the shaft 1, through which said pin 17 may enter. The rod 19 is provided with a screw-threaded portion 23, which takes within the internally-threaded end of the shaft 1, so that by holding said shaft against rotation and turning said rod the latter will be advanced within or partially withdrawn from the recess within the shaft, the beveled end 21 coöperating with the beveled-end pin 17 to move the eccentric-frame 6 on the pivot-screw 7, thus effecting the desired shifting of the eccentric 8 in the direction required. It will of course be understood that the spring 16 exerts a tendency to keep the beveled-end screw-pin 17 pressed against the adjusting-rod, as does also the resistance or load carried by said eccentric when in operation, which will be readily understood by reference to Fig. 4, wherein the direction in which the shaft and eccentric rotate is indicated by the arrow. The adjusting-rod 19 is held against unintentional shifting by friction supplied by splitting said rod through the center, as shown at 24, Figs. 1 and 7, and bending the two sides thus formed slightly away from each other, as shown especially in Fig. 7. When inserted in operative position within the recess 18 in the end of the shaft 1, the sides formed by the slit 24 will be resiliently compressed and sufficient friction thereby obtained to retain said rod in any desired adjusted position. The means herein described for frictionally holding the adjusting-rod 19 against accidental movement is simply a chosen form of construction and not essential to the practical operation of our invention. Other means—such, for instance, as making the screw-thread 23 tight-fitting—would answer the purpose.

25 is an eccentric-strap rod of any approved construction, the upper end of which embraces the adjustable eccentric 8, while the lower end is pivotally connected by means of a lever 26 to a feed rock-shaft 27, suitably journaled in bearings beneath the machine-frame.

28 is an ordinary eccentric fast on the upper shaft 1, and 29 is an eccentric-strap rod the upper end of which embraces the eccentric 28 adjacent to the adjustable eccentric 8, while the lower end of said rod 29 is pivotally connected by means of a lever 30 to a feed rock-shaft 31, also journaled in bearings beneath the machine-frame.

The respective feed rock-shafts 27 and 31 are shown of usual, but may be of any approved, construction, and they effect the operation of feeding the material in the ordinary manner, the rock-shaft 31 causing the rise and fall of the usual feed-dog, (see Fig. 15,) while the rock-shaft 27 causes the forward and return movements of said feed-dog, the construction and operation of these parts being well known.

32 is the usual band-wheel fast on the end of the shaft 1, by means of which power is transmitted to the machine in the usual manner, and 33 is an annular recess formed in the hub of said wheel, within which projects a barrel 34, formed upon the knurled thumb-piece 20. For the convenience of the operator the barrel 34 is marked with suitably-graduated lines adapted to register with the end of the band-wheel hub, as shown in Fig. 1, to facilitate changing the length of stitch.

The operation of so much of our improvement as has been described in detail is as follows: The parts being in the position illustrated in Figs. 3 and 4, wherein the eccentric 8 is shown adjusted for the longest stitch required, if it be desired to shorten the stitch the machine is brought to a standstill. The operator then grasps the knurled thumb-nut and rotates the same until the adjusting-rod 19 is withdrawn sufficiently to permit the eccentric 8 to be swung by the force of the spring 16 to a position more nearly concentric with the shaft 1, which will of course lessen the throw of the eccentric 8, and consequently shorten the length of the stitch. It will be seen that the farther said adjusting-rod is withdrawn from the position illustrated the shorter will be the throw of the eccentric 8 until the position illustrated in Fig. 5 has been attained, wherein the eccentric 8 has been given a position concentric with the shaft by which it is driven, and therefore no stitches will be formed.

In Fig. 11 we have illustrated a modified form of adjusting-rod 35, wherein the beveled or tapered portion 36 thereof is made considerably longer than in the previously-described rod and the screw-threaded portion 23 of the latter is omitted. In operation the adjusting-rod 35 is moved in and out manually without the aid of a screw, and suitable graduated lines 37 may be scored thereon adapted to register with the end of the shaft 1 as a stitch-gage. With the construction shown in Fig. 11 it is not necessary to stop the machine in order to change the length of stitch, since this may be effected by a slight tap with the hand or an implement upon either side of the knurled thumb-piece 38 on said rod—a feature in some instances considered desirable.

In Figs. 8, 9, and 10 we have illustrated a further modified form of our invention wherein the spring 16 for returning the eccentric-frame $6^\times$ in one direction is omitted, the latter being shifted in either direction by positive means. In this construction the pockets 12 and 13 are also omitted, as are likewise the arcuate slot 10 and screw 11, and in lieu thereof said frame is provided with an aperture 39, adapted to operatively embrace an adjusting-eccentric 40, rigid on the end of a short shaft 41, journaled in the disk or pulley 4, parallel with the shaft 1. On the opposite end of the shaft 41 is rigidly secured a spur-gear 42, which meshes with a pinion 43, cut on the end of the adjusting-rod $19^\times$, which, as before, is inclosed within a recess in the end of the shaft 1 and is equipped with a knurled thumb-piece 20. 44 is an opening cut within the tubular portion of the shaft 1, through which the gear 42 protrudes to intermesh with the pinion 43. 45 is a headed screw tapped within the end of the adjusting-rod $19^\times$, the function of which is to prevent the withdrawal of the rod $19^\times$, the head of said screw serving as an annular shoulder or flange against which the flat ends of the teeth of the spur-gear 42 will impinge should the withdrawal of said rod $19^\times$ be attempted. The operation of this modified construction is as follows: As in the construction shown in Figs. 3 and 4 described, it is necessary to turn the adjusting-rod 19 within the shaft 1 in order to adjust the throw of the eccentric 8. Likewise in this modified construction it is necessary to turn the adjusting-rod $19^\times$; but in the present instance the latter will simply rotate and no longitudinal movement will be communicated thereto. The rotation of the rod $19^\times$, on which the pinion 43 is cut, will effect the partial rotation of the shaft 41 and eccentric 40, rigid thereon, through the spur-gear 42, and the eccentric-frame $6^\times$, carrying the eccentric 8, will be shifted to increase or decrease the throw of the same, as the case may be, as will be perfectly clear by reference to Fig. 8.

In Fig. 12 we have shown a modification of our construction relating particularly to the manner of mounting the eccentric-frame. In this construction the parts are precisely similar to the construction illustrated in Figs. 3 and 4, except that the eccentric-frame $6^{\times\times}$ is made to slide in suitable ways 46, cut within the face of the pulley or disk 4 instead of being pivoted thereon.

In Figs. 13 and 14 we have shown another modified form of adjusting-rod and the manner of mounting it on the shaft 1. In this construction as a substitute for the recess 18 a longitudinal groove 47 is cut in the surface of the shaft 1 after the manner of a key-seat, and the rod 48 is fitted to this groove so as to be capable of sliding therein. The other parts are as in Fig. 11.

We do not wish to be limited to the exact details of construction shown and described, since such details may be greatly varied without departing from the spirit of our invention.

What we claim is—

1. In a sewing-machine, stitch-forming mechanism, a cloth-feeding mechanism including a feed-dog, an upper shaft, an adjustable eccentric mounted upon said shaft, an eccentric-adjusting rod arranged within said shaft and movable longitudinally therein to effect an adjustment of the eccentric transversely to the axis of the shaft, an eccentric-strap rod applied to said eccentric, connections between said strap-rod and the feed-dog to impart longitudinal movements to the feed-dog, an independent eccentric on said shaft, a strap-rod applied thereto, and a connection for said strap-rod with the feed-dog to impart vertical movements to said feed-dog.

2. In a sewing-machine, stitch-forming mechanism, a cloth-feeding mechanism including a feed-dog, an upper shaft, a support mounted upon the said shaft, an eccentric on said support capable of adjustment transversely to the axis of said shaft, an eccentric-adjusting rod arranged within said shaft and coöperating with said eccentric to effect its said adjustment, an eccentric-strap rod applied to said eccentric, and connections between said strap-rod and the feed-dog, to vary the throw of the feed, substantially as described.

3. In a sewing-machine, stitch-forming mechanism, a cloth-feeding mechanism including a feed-dog, an upper shaft, an adjustable eccentric mounted upon said shaft, an eccentric-adjusting rod arranged within said shaft and movable longitudinally therein to effect a variation of the eccentricity of said eccentric with relation to the axis of the shaft, a feed rock-shaft connected with the feed-dog, a crank-lever on said rock-shaft, and an eccentric-strap rod applied to the eccentric on the upper shaft and connected with the lever on the rock-shaft.

4. In a sewing-machine, stitch-forming mechanism, a cloth-feeding mechanism including a feed-dog, a needle-actuating shaft, a pulley on said shaft, a frame mounted upon said pulley, an eccentric carried by said frame and surrounding the needle-shaft, an eccentric-adjusting rod mounted in said shaft and adjustable longitudinally of the shaft to effect an axial adjustment of the eccentric relatively to said shaft, a rock-shaft connected with the feed-dog, an eccentric-lever on said shaft, and an eccentric-strap rod connecting the eccentric on the needle-shaft with the crank-lever on the rock-shaft.

5. In a sewing-machine, stitch-forming mechanism, a feed-dog, means to reciprocate said feed-dog longitudinally, a feed-shaft, an adjustable frame on said shaft, a changeable eccentric mounted on said frame, a spring to automatically move said frame in one direction, and an adjusting-rod on the shaft coacting with said frame to move it in the other direction to change the relative eccentricity of the said eccentric and shaft.

6. In a sewing-machine, stitch-forming mechanism, and cloth-feeding mechanism including a shaft, a disk thereon, a frame mounted upon said disk and having an eccentric through which the shaft freely passes, a spring carried by the frame and acting upon the shaft to automatically hold the eccentric in relative greatest concentricity with respect to the shaft, a pin arranged in said frame opposite the spring, and an adjusting-rod on said shaft coöperating with said pin to vary the eccentricity of the eccentric.

In testimony whereof we have hereunto set our hands this 4th day of May, A. D. 1901.

WILBUR F. DIAL.
GEORGE M. EAMES.
GEORGE H. DIMOND.

Witnesses:
  FREELAND W. OSTROM,
  C. N. WORTHEN.